Dec. 10, 1963 J. R. MORLEN 3,113,473
ROTARY DRIVE ACTUATING MECHANISM
Filed July 6, 1961 2 Sheets-Sheet 1

INVENTOR.
Jon R. Morlen
BY Hilmond O. Vogel
Atty.

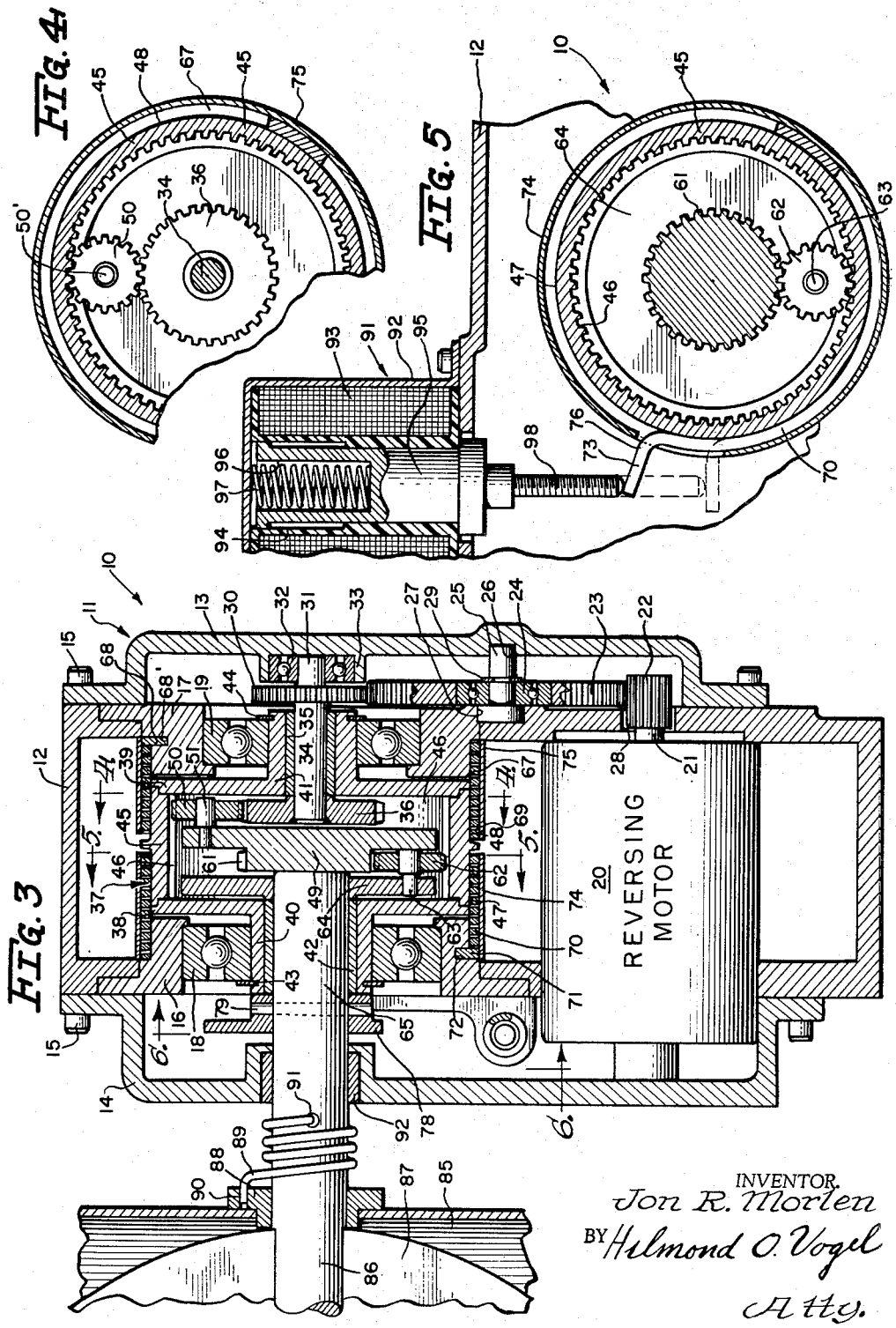

United States Patent Office 3,113,473
Patented Dec. 10, 1963

3,113,473
ROTARY DRIVE ACTUATING MECHANISM
Jon R. Morlen, Wheaton, Ill., assignor to Calco Manufacturing Company, a corporation of Illinois
Filed July 6, 1961, Ser. No. 122,217
7 Claims. (Cl. 74—785)

This invention relates to a rotary driving mechanism and more particularly to an electrical mechanical actuator for imparting rotating movement.

A primary object of this invention is to provide an improved actuating mechanism for imparting a rotary drive from an electric motor to a gear reduction drive in the form of a planetary transmission to an output shaft for effecting rotary movement.

Still another object is to provide an improved rotary driving mechanism driven by an electric motor for imparting rotating power in one direction, the said mechanism including a gear reduction drive and being provided with an improved braking mechanism effective to automatically provide for rotating movement of an output shaft in an opposite direction during power failure.

Still another object is to provide an improved electro-mechanical actuator wherein power is derived from an electric motor which in turn drives an output shaft through a suitable gear reduction drive having braking and debraking means positionable to impart rotating movement to an output shaft in one direction and the said shaft being rotatable in a second direction during a power failure in the mechanism.

Still another object is the provision of an improved electro-mechanical actuator device including an electric motor adapted to rotate an input shaft connected to the sun gear of a planetary transmission, the said transmission including a ring gear having a braking surface adapted to be held in stationary relation by means of a helical braking spring wherein power through the input shaft is directed to an output shaft, the said helical spring being movable in a brake releasing manner whereby power from the input shaft to the output shaft ceases.

A still further object is the provision of an improved electro-mechanical actuator wherein power through an input shaft is transmitted through an output shaft by means of a planetary transmission having an improved braking device for holding the ring gear in a stationary position the said improved braking device comprising a spring adapted to brake and retain the ring gear against rotation in one position and being movable during a power failure to release the ring gear whereby power through the output shaft ceases and the shaft may be rotated in an opposite direction.

A still further object is the provision of an improved electro-mechanical actuating device including a planetary transmission having an improved braking arrangement for maintaining the ring gear of the planetary transmission stationary the said braking device comprising a helical spring adapted to tightly engage the ring gear during rotation of the same in one direction and the said braking device being quickly releasable for permitting rotation of the said ring gear.

These and more specific objects will become more readily apparent from a reading of the description when examined in connection with the accompanying sheets of drawings.

In the drawings:

FIGURE 3 is an enlarged cross sectional view taken substantially along the line 3—3 of FIGURE 1;

FIGURE 4 is a detailed cross sectional view taken substantially along the line 4—4 of FIGURE 3;

FIGURE 5 is a cross sectional view taken substantially along the line 5—5 of FIGURE 3;

Figure 1:
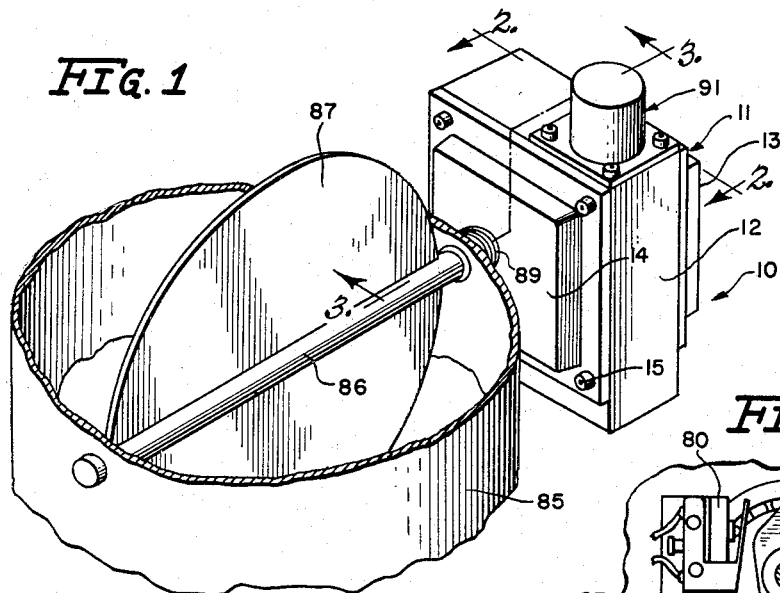
FIGURE 1 is a perspective view showing the improved electric mechanical actuating mechanism in conjunction with a butterfly valve.
Figure 2:
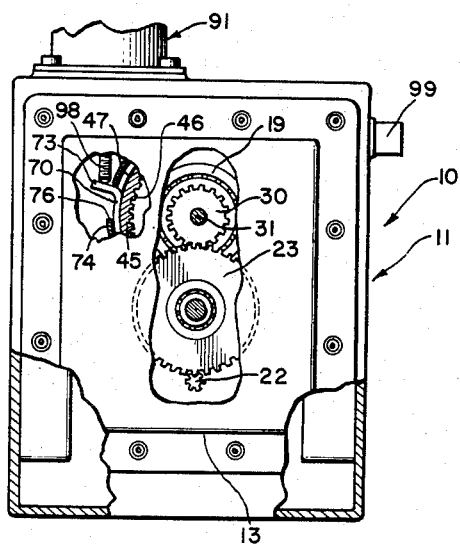
FIGURE 2 is a front elevational view of the actuating device shown in FIGURE 1 with portions broken away to show internal operating parts of the invention.

Referring now particularly to FIGURES 1, 2 and 3 an electric mechanical actuating mechanism or device is generally designated by the reference character 10. The actuating mechanism 10 comprises a supporting means in the form of a casing 11. The casing 11 is provided with a central body portion 12 and includes a front cover 13 and a rear cover 14 the said covers being removable by means of screws 15. A pair of axially spaced bearing supports 16 and 17 are supported on the body portion 12 and suitably support spaced bearing assemblies 18 and 19.

A reversible motor is designated at 20 and is suitably supported on the body portion 12, the reversible motor 20 drives a shaft 21 which projects outwardly and has connected thereto a drive pinion 22. The drive pinion 22 is in meshing engagement with a gear 23 supported on a bearing assembly 24 which in turn is supported on a shaft 25 having one end supported in a bore 26 of the front cover 13 and being supported at its rear in a bore 27 of a part of the body portion 12. The pinion 22 projects through an opening 28 also provided in the body portion 12. The bearing 24 is suitably keyed in position on the shaft 25 by means of a key 29.

The gear 23 drives a gear 30 supported on a stub shaft 31 in driving relation, the said stub shaft 31 being rotatable in a bearing assembly 32 supported in a boss 33 of the cover 13. The gear 30 drives in input shaft 34 rotatable in a sleeve-type bearing 35 and a sun gear 36 is driven by the input shaft 34.

An epicyclic gear train or planetary transmission is generally designated by the reference character 37. The transmission 37 comprises axially spaced cylindrical side plates 38 and 39 respectively being provided with hubs 40 and 41. The hub portion 40 is rotatably supported on a bearing sleeve 42 and on the bearing assembly 18. The hub 41 is supported on the bearing sleeve 35 and on the bearing assembly 19. Suitably key members 43 and 44 retain the bearings 18 and 19 in position.

The transmission 37 further comprises a ring gear 45 which is suitably secured to the side plate members 38 and 39 to form a complete unit. The ring gear 45 is provided with internal teeth 46 and is provided on its outer surface with braking surfaces 47 and 48 axially spaced with respect to each other. The transmission 37 further is provided with a planetary carrier 49 having a planetary gear 50 rotatably carried on a shaft 51 connected to the carrier 49. The planetary gear 50 is rotatable and in mesh with the ring gear teeth 46 and also is in meshing engagement with the sun gear 36.

The planetary carrier 49 is provided with a gear 61 meshing with a planetary gear 62 suitably supported on a shaft 63 carried by a cylindrical carrier 64. The cylindrical carrier 64 is rigidly connected to rotate the output shaft 65.

Figure 7:
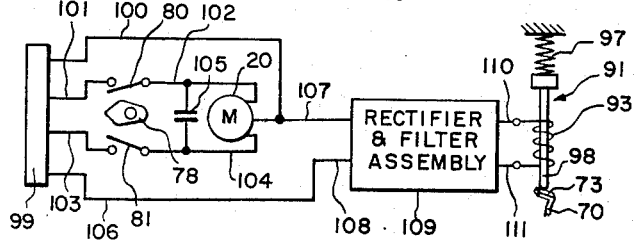
FIGURE 7 is a schematic wiring diagram showing a circuit for operating an improved electric mechanical actuating mechanism.

The outer braking surface 48 is provided with a braking spring 67 having one end 68 suitably anchored within a recess 68', as shown in FIGURE 3, provided in the bearing support 17. The spring 67 is a helical spring having rectangularly shaped wound portions or coils. The spring 67 is provided with a free-end portion 69 which is not anchored. A similar braking spring 70 is wound about the braking surface 47 and is suitably anchored by one end at 71 within a recess 72 formed in the bearing support 16. The braking spring 70 is provided with a free non-anchored end portion which includes a tab 73 as best shown in FIGURES 2, 5 and 7.

In the ensuing description the rotation of the shafts and the windings of the spring will be referred to as "clockwise" or "counterclockwise." This terminology will refer to the position where one is looking directly toward the front cover 13 as shown in FIGURE 2. Thus, for instance, it will be said that the gear 23 may rotate in a "clockwise" or "counterclockwise" direction as viewed in FIGURE 2. The springs 67 and 70 are braking springs in that they brake the outer surfaces 47 and 48 to restrain rotation of the ring gear 45 if it is moving clockwise or counterclockwise. The spring 67 is wound from its anchor upwardly and in a counterclockwise direction about the surface 48 so that when the ring gear 45 is urged in a counterclockwise direction, the spring 67 will, by frictional engagement, tighten about the surface 48 to further restrain or prevent any further rotation of the ring gear. On the other hand the spring 70 from its anchor portion is wound upwardly and around the surface 47 in a clockwise direction so that if the ring gear 45 is urged in a clockwise direction the coils of the spring 70 will frictionally engage and tighten around the surface 47 to prevent further clockwise rotation of the ring gear 45. The principle which is utilized, of course, is the principle of the helical spring brake wherein rotation of a shaft or other rotating member is halted by the tightening of the coils of the spring which are so wound about the shaft as to tighten when the shaft rotates in one direction but to immediately loosen when the shaft rotates in the opposite direction. Thus in the present construction, the one spring 67 prevents rotation of the ring gear 45 in one direction and the spring 70 prevents rotation in an opposite direction.

The springs 67 and 70 are also surrounded by retainer sleeves 74 and 75. These retainer sleeves 74 and 75 permit the spring to loosen but limit the amount of clearance so that when the spring is moved to loosen about the ring gear braking surface the coils will loosen in a uniform manner.

Figure 6:
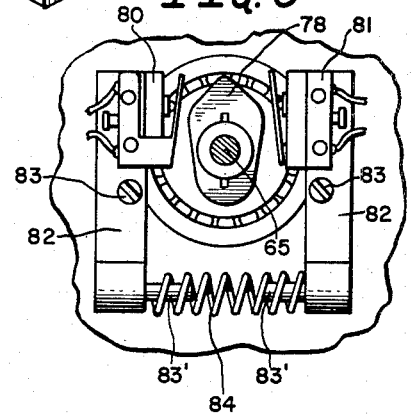
FIGURE 6 is a detailed sectional view along the line 6—6 of FIGURE 3.

Referring now particularly to FIGURES 3 and 6 a switch actuator is designated at 78 and it is suitably connected for rotation to the output shaft 65 by means of a pin 79. The actuator 78 is adapted to engage micro switches 80 and 81 depending upon movement of the output shaft 65. The micro switches 80 and 81 are suitably supported on pivot brackets 82 pivotally supported on pivot screws 83. Pins 83' are connected to the brackets 82 and retain a spring 84. The pivot brackets 82 are effective to accommodate slight-over travel of the switch actuator 78 during its movement in opposite directions.

A tube or duct is designated at 85 in FIGURES 1 and 3 and the output shaft 65 is provided with an extension 86 suitably supported for rotation on the tube or duct 85. The extension 86 has connected thereto a butterfly valve 87 for opening and closing the duct 85. The extension 86 is rotated in a bearing 88 suitably supported on the duct 85. A coil spring 89 has one end anchored as indicated at 90 and is wound about the shaft 65 and has its other anchored as indicated at 91. A bearing 92 in the cover 14 also suitably supports the output shaft 65.

Referring now particularly to FIGURES 1, 5 and 7 the unit 10 is also provided with a solenoid 91 comprising a casing 92 having a suitable solenoid coil 93. A sleeve 94 is provided within the casing 92 and supports for reciprocation a plunger body 95 having a suitable bore 96 which seats a spring 97. The plunger body 95 also includes a plunger extension 98 which is adapted as indicated in FIGURE 5 to engage the spring end tab 73 of the spring 70.

The electrical circuit is best shown in FIGURE 7 and a suitable inlet plug is designated at 99. The inlet plug 99 is of a four prong type and includes a wire 100 connected to the reversible motor 20. A wire 101 connects to the micro switch 80 and a wire 102 connects from the micro switch to the motor 20. A wire 103 connects to the micro switch 81 and a wire 104 connects to the micro switch 81 and to the motor 20. The wires 104 and 102 are also connected as indicated to a capacitor 105. A wire 106 connects to a rectifier and filter assembly 109 which is also connected to a wire 107 connected to the motor 20. Wires 110 and 111 connect from the filter rectifier and filter assembly 109 to the solenoid 91.

*The Operation*

The present disclosure shows the actuator 10 operable to open and close the butterfly valve 87. The motor is of reversible or reversing type so that the output shaft 65 may rotate in clockwise and counterclockwise directions.

To close the butterfly valve 87 the output shaft 65 may be moved in a counterclockwise direction when viewed in FIGURE 2. Thus the reversing motor 20 is operated to move the gears 30 and gear 36 in a counterclockwise direction which then rotates the planetary gears 50 and 62 in a clockwise direction. This will have a tendency to turn the ring gear 45 also in a clockwise direction which will almost immediately cause the frictional engagement of the spring 70 to tighten about the surface 47 so that the ring gear 45 is then held against further rotation. Now with the ring gear 45 held against rotation the planetary carriers 49 and 64 will rotate the shaft 65 in the counterclockwise direction tightening the spring 89 and causing the butterfly valve 87 to close the duct 85. Thus the spring 70 from its anchor point at 72 is wound upwardly and around the ring gear 45 in a clockwise direction.

On the other hand the spring 67 is wound about the ring gear 45 in a counterclockwise direction, that is from its anchor point 68' it is wound upwardly and around the ring gear 45 in a counterclockwise direction. The actuator may be controlled by an external source (not shown) to function at a precise or given moment. As the output shaft 65 moves in a counterclockwise direction the butterfly valve 87 closes and the actuator 78 engages the micro switch 81 to shut off the motor 21. At a precise impulse from an outside electrical control (not shown) the motor 20 may be then reversed and the actuator 78 is moved in an opposite direction so that the shaft 65 then opens the valve 87. Thus if the shaft 34 is driven in a clockwise direction the spring 67 restrains the ring gear 45 so that the carriers 49 and 64 are moved in a clockwise direction to open the valve 87.

In the present arrangement it may be particularly important to open the butterfly valve 87 in the event of power failure which would normally prevent the opening of the valve at the selected predetermined time. In other words a power failure would prevent the reversing motor from responding at the predetermined interval when it is necessary to open the butterfly valve 87. In the event of such a power failure, the solenoid 91, which is normally energized as indicated in FIGURE 5, is de-energized, because of such power failure, and the spring 97 is effective to urge the plunger 98 in engagement with the tab 73 of the spring 70 to move the same downwardly thereby opening up the coils of the spring 70 so that the ring gear 45 may now move and is no longer held against rotation by the spring 70. The shaft 65 is now free to rotate in a clockwise direction since the spring 89 constantly urges the shaft to rotate in the clockwise direction. The spring 67 will permit free rotation in this direction. Thus the butterfly valve 87 is immediately opened in the event of power failure which may be necessary to safe-guard the operation of the equipment not shown which may be involved with the butterfly valve 87.

The actuating mechanism thus in this particular application has extreme facility and use for instantaneously safe-guarding a system so that the valve can be opened in the event of power failure. The actuating mechanism, of course, has many other uses for actuating different types of rotating shafts wherein instantaneous release of braking is desired or necessary. For instance it is contemplated that a single brake spring may be utilized and when necessary to immediately stop rotation of a shaft, it is possible on the part of an operator to actuate a solenoid or similar device which engages the spring tab to release the same so that the actuator no longer is in rotating operation with respect to the aforementioned shaft.

The present adaptation of the actuator to the butterfly valve is only one of many uses and it is apparent that the novel combination of elements which are shown and claimed can be utilized in many different types of devices where release of a braking action of a shaft is immediately necessary. Similarly it is possible to utilize additional planetary gears within the system which includes the novel braking spring arrangement operative in connection with the ring gear.

Thus it is believed that the objects of the invention have been fully achieved and changes and modifications may be made without departing from the spirit of the invention as disclosed or from the scope thereof as defined in the appended claims.

What is claimed is:

1. An actuating device comprising a supporting structure, a power input shaft rotatable on said supporting structure, an electrical motor connected to said input shaft for rotating the same in one direction, an output shaft supported for rotation on said supporting structure, first means connected to said output shaft normally urging said output shaft to rotate in an opposite direction, planetary means connecting said input and output shafts, said planetary means comprising a sun gear driven by said input shaft, a planetary carrier, second means connecting said planetary carrier to said output shaft in driving relation, planet gear means on said carrier engaging said sun gear, a ring gear having a braking surface, said ring gear engaging said planet gear means, braking means to restrict rotation of said ring gear during rotation of said input shaft whereby said output shaft is rotated, comprising a helical spring having one end anchored on said supporting structure and said helical spring having a release element, said spring being wound around said braking surface whereby said spring tightens around said braking surface during rotation of said input shaft to prevent said ring gear from turning, means to loosen said spring including a solenoid, an electrical connection to said motor and to said solenoid, said solenoid including plunger means normally retracted during energization of said electrical connection and said motor, and means urging said plunger in engagement with the release element of said spring during de-energization of said electrical connection whereby said release element is moved to release said first spring from braking action with said braking surface, and said first means connected to said output shaft rotates said shaft in an opposite direction.

2. An actuating device in accordance with claim 1 wherein said first means connected to said output shaft includes a resilient element.

3. For a valve having a resilient element urging said valve in one direction, an actuating device comprising a supporting structure, a power input shaft rotatable on said supporting structure, an electrical motor connected to said input shaft for rotating the same in an opposite direction, an output shaft supported for rotation on said supporting structure, means connecting said output shaft to said valve to move the same in said opposite direction, planetary means connecting said input and output shafts, said planetary means comprising a sun gear driven by said input shaft, a planetary carrier, means connecting said planetary carrier to said output shaft in driving relation, planet gear means on said carrier engaging said sun gear, a ring gear having a braking surface, said ring gear engaging said planet gear means, braking means to restrict rotation of said ring gear during rotation of said input shaft, comprising a helical spring having one end anchored on said supporting structure, said spring being wound around said braking surface whereby said spring brakes said braking surface in response to initial rotation of said ring gear when said input shaft is rotating, means to release said spring including a solenoid, an electrical connection to said motor and to said solenoid, said solenoid including plunger means normally retracted during energization of said electrical connection and said motor, and means urging said plunger means in engagement with the spring during de-energization of said electrical connection whereby said spring is released and said resilient element of said valve rotates said output shaft in the first direction.

4. For a valve having a resilient element urging said valve in one direction, an actuating device comprising a supporting structure, a power input shaft rotatable on said supporting structure, a motor connected to said input shaft for rotating the same in an opposite direction, an output shaft supported for rotation on said supporting structure, means connecting said output shaft to said valve to move the same in said opposite direction, planetary means connecting said input and output shafts, said planetary means comprising a sun gear driven by said input shaft, a planetary carrier, means connecting said planetary carrier to said output shaft in driving relation, planet gear means on said carrier engaging said sun gear, a ring gear having a braking surface, said ring gear engaging said planet gear means, braking means to restrict rotation of said ring gear during rotation of said input shaft, comprising a helical spring having one end anchored on said supporting structure, said spring being wound around said braking surface whereby said spring brakes said braking surface in response to initial rotation of said ring gear when said input shaft is rotating, means to release said spring and said resilient element of said valve rotates said output shaft in the first direction.

5. An actuating device comprising a support, an input shaft rotatable on said support, means to rotate said input shaft in one direction, an output shaft rotatable on said support, a planetary transmission connecting said shafts, said transmission including a ring gear having a braking surface, brake means for preventing rotation of said ring gear when said input shaft rotates whereby rotation in the same direction is imparted to said output shaft, said brake means including a helical spring connected to said support and being wound about said braking surface to restrain rotation of said ring gear, and means for releasing said spring whereby said ring gear is free to rotate and said output shaft is free to rotate in an opposite direction.

6. An actuating device in accordance with claim 5 wherein said means to release said spring includes a solenoid having a plunger engageable with a portion of the spring to loosen the same.

7. An actuating device in accordance with claim 6 including resilient means normally urging said output shaft in the opposite direction.

References Cited in the file of this patent

UNITED STATES PATENTS 2,434,480     Anderson _____ Jan. 13, 1948
3,018,673     Hitt et al. _____ Jan. 30, 1962